July 7, 1970 J. STEPHEN 3,519,179
CAR TOP CARRIER
Filed May 1, 1968 2 Sheets-Sheet 1
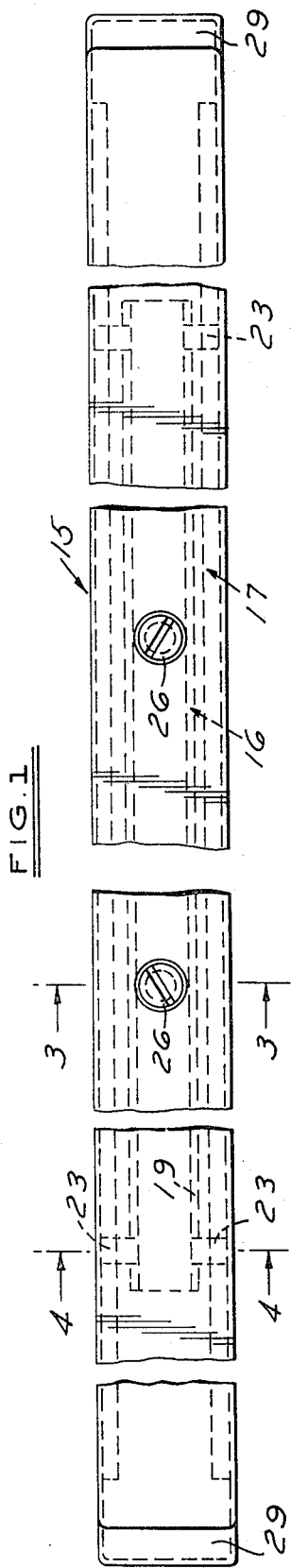
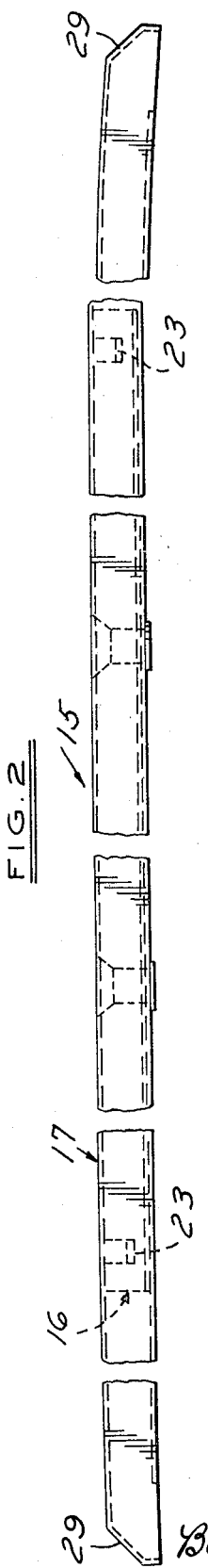
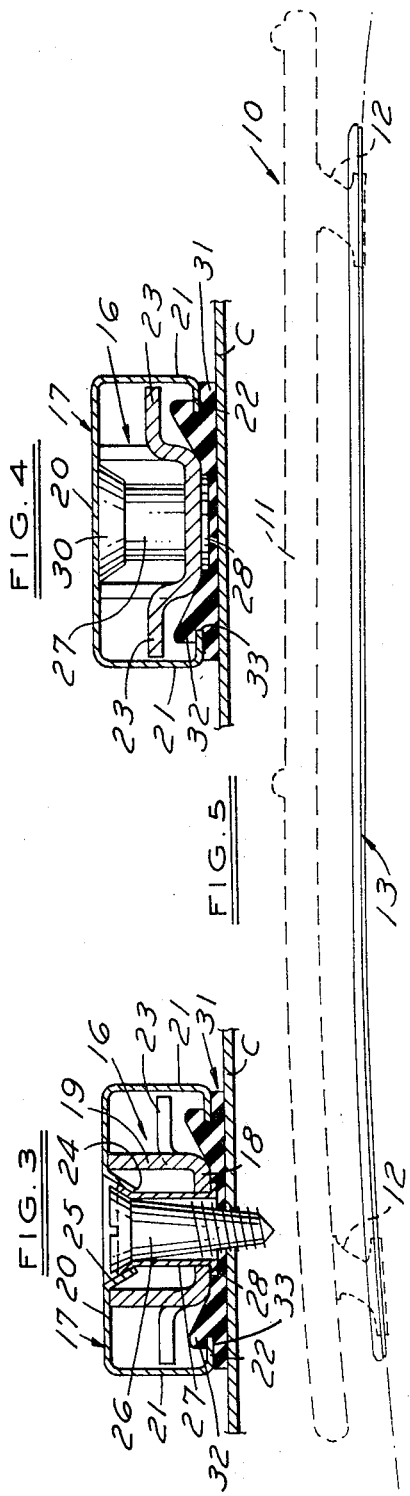
INVENTOR
JAMES STEPHEN
BY
Barnes, Kisselle, Raisch & Choate
ATTORNEYS

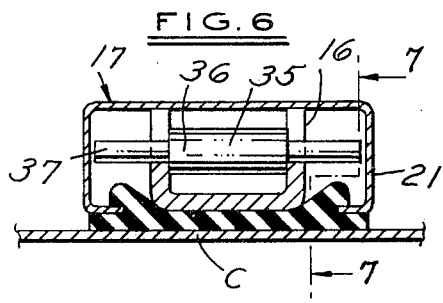
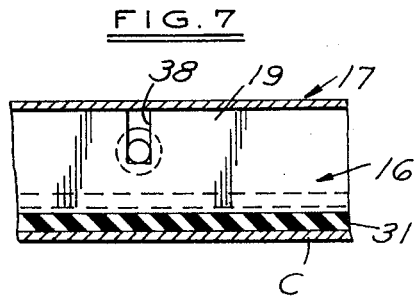
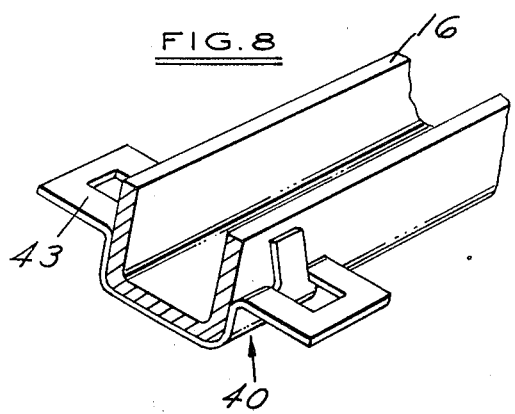
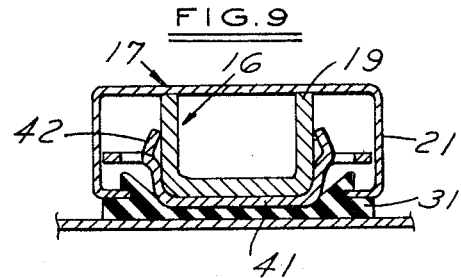
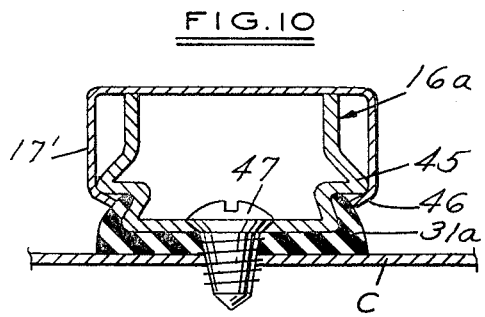
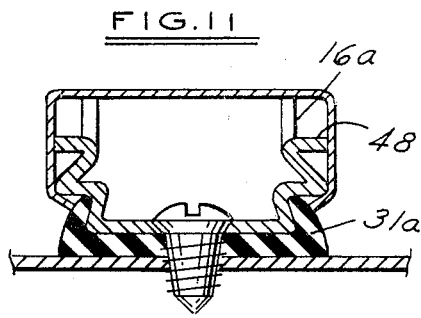

United States Patent Office 3,519,179
Patented July 7, 1970

3,519,179
CAR TOP CARRIER
James Stephen, Royal Oak, Mich., assignor to Helm Design & Manufacturing, Inc., Detroit, Mich., a corporation of Michigan
Filed May 1, 1968, Ser. No. 725,662
Int. Cl. B60r 9/04
U.S. Cl. 224—42.1                                29 Claims

ABSTRACT OF THE DISCLOSURE

A base deck for a car top carrier comprising a plurality of strip assemblies fastened to the car top. Each strip assembly comprises a U-shaped channel member and a strip having a base and side walls telescoped over the channel member. Portions of the channel member are struck outwardly and extend into closely adjacent relationship with the inner surfaces of the side walls of the strip. Fastener means are provided at longitudinally extending points and extend through the strip and the channel member to fasten each strip assembly to the car top.

---

This invention relates to car top carriers and particularly to the base strip assembly for car top carriers.

In car top carriers, it is common to provide longitudinally extending, load-bearing strips on the top of the car to support the weight of the load. These strips serve both a structural and decorative function. In order to make each strip of sufficient strength, it ordinarily must be made of heavy gauge material which in the case of stainless steel or the like substantially increases the cost of the carrier.

Among the objects of the invention are to provide a car top carrier and particularly a load supporting base for a car top carrier which is attractive and yet low in cost; which can be readily applied; and which is sufficiently strong to withstand the load supplied thereto.

In the drawings:

FIG. 1 is a fragmentary plan view of a strip assembly embodying the invention.

FIG. 2 is a fragmentary side elevational view of the same.

FIG. 3 is a fragmentary sectional view on an enlarged scale taken along the line 3—3 in FIG. 1.

FIG. 4 is a fragmentary sectional view on an enlarged scale taken along the line 4—4 in FIG. 1.

FIG. 5 is a partly diagrammatic side elevational view of a car top carrier embodying the invention.

FIG. 6 is a transverse sectional view of a modified form of the invention.

FIG. 7 is a fragmentary sectional view taken along the line 7—7 in FIG. 6.

FIG. 8 is a part sectional fragmentary perspective view of a further modified form of the invention.

FIG. 9 is a transverse sectional view of the form of the invention show in FIG. 8.

FIG. 10 is a transverse sectional view of a further modified form of the invention.

FIG. 11 is a transverse sectional view of a further modified form of the invention.

Referring to FIG. 5, the invention relates to a car top carrier 10 which comprises side rails 11 supported by stanchions 12 fastened to the car top. The invention in particular relates to the load supporting base or deck 13 that is adapted to support the load and particularly to strip assemblies 15 that are provided in parallel spaced, longitudinally extending relationship on the car top C.

Referring to FIGS. 1–4, each strip assembly 15 comprises a U-shaped support channel 16 and a strip 17 telescoped over the channel 16. The channel 16 is made of heavy material such as steel while the strip 17 is made of lighter weight sheet metal such as stainless steel.

Channel 16 comprises a base 18 and legs 19. Strip 17 comprises a base wall 20, side walls 21, and inwardly extending flanges 22. As shown in FIGS. 3 and 4, the legs 19 of channel 16 are spaced from the walls 21. Integral tabs 23 are struck outwardly and bent downwardly from the legs 19 at longitudinally extending points into substantially horizontal relation so that the ends thereof are substantially adjacent the inner surfaces of the walls 21. In this manner the strip 17 is spaced laterally with respect to the support channel 16. The upper edges of legs 19 engage the inner surface of the base wall 20 of strip 17.

At longitudinally spaced points the base wall 20 of strip 17 is formed with openings 24 the sides of which are tapered as at 25 to receive screws 26 that are threaded downwardly into the car top C. A collar 27 is provided in each opening and includes a conical seat 30 at its upper end and an integral flange 28 at its lower end that extends beneath the base 18 of the channel 16. This strengthens the joint and minimizes any tendency for the base wall 20 of the strip 17 to become dimpled by excessive threading of the screw 26 inwardly.

As shown in FIGS. 1 and 2, the ends of the strip 17 are formed with walls 29 that taper downwardly and close the ends of the strip 17.

As shown in FIGS. 3 and 4, an insulator strip 31 of of resilient material such as rubber is provided between the channel 16, strip 17 and the car top C. The insulator 31 includes longitudinally extending ribs 32 having slots 33 therein for receiving the free edges of the inwardly bent side wall 21 of the strip 17. When the screws 26 are tightened downwardly, the base 18 of the channel 16 engages the top of the insulator 31 forcing the channel toward the car top. This also causes the walls 21 to force the edges of the insulator 31 downwardly against the car top.

In the form of the invention shown in FIGS. 6 and 7, the spacing of the walls 21 of the strip 17 with respect to the channel 16 is achieved by spacer elements 35 that comprise a central cylindrical portion 36 and outwardly extending axially aligned pin portions 37. The spacer elements 35 are provided at longitudinally spaced points along the channel 16 and are positioned in upwardly open slots 38 in the side walls 19 of the channel 16 with the pin portions 37 extending outwardly with their ends in close proximity with the inner surfaces of the walls 21 of the strip 17.

In the form of the invention shown in FIGS. 8 and 9, the spacer elements comprise members 40 of spring steel which include a U-shaped portion 41 that is snapped over the base of the channel 16 and inwardly extending spring fingers 42 that frictionally engage the side walls 19 of the channel 16. Outwardly bent portions 43 extend toward the inner surface 21 of the strip to perform the spacing function.

In the form of the invention shown in FIG. 10, the channel 16a has portions 45 bent outwardly along the entire length thereof and the free edge 46 of the strip 17' is snapped over the portions 45. In this form, the portions 45 perform the dual function of the spacer elements and also the elements over which the edges of the strip 17' are snapped. In this form, the screw 47 extends downwardly and is threaded into the car top C so that the head of the screw is covered entirely by the top wall of the strip 17'.

In the form of the invention shown in FIG. 11, additional spacing fingers 48 are bent outwardly from the side walls of the strip 16a so that dual spacing means are provided along each wall of the strip.

I claim:

1. In a car top carrier, the combination comprising:
   a plurality of generally parallel longitudinally extending base strip assemblies,
   each said strip assembly comprising a support channel member including a base portion adapted to extend along the car top,
   and leg portions extending upwardly therefrom,
   and an outer stip telescoped over said support channel,
   said outer strip comprising a base wall and side walls extending longitudinally of said base wall,
   said base wall engaging the ends of said leg portions of said support channel member,
   said leg portions of said support channel being spaced from the side walls of said strip,
   means extending from said leg portions of said channel outwardly into close proximity with the walls of said strip, and
   fastener means extending through said channel member for mounting said strip assembly on a car top.

2. The combination set forth in claim 1 wherein said outwardly extending means comprise integral portions.

3. The combination set forth in claim 2 wherein said integral portions comprise struck-out tabs bent downwardly from the leg portions of said channel member.

4. The combination set forth in claim 1 wherein said fastener means comprise screws extending through said strip as well as said channel member.

5. The combination set forth in claim 1 wherein portions of said strip engage portions of said channel to hold said channel in position on said strip,
   said fastener means extending through said channel member only.

6. The combination set forth in claim 1 wherein said outwardly extending means comprise integral portions of the side walls of said channel member.

7. The combination set forth in claim 6 including struck-out tabs bent outwardly from the leg portions of said channel member.

8. The combination set forth in claim 1 wherein said outwardly extending means comprises spacer elements, each having an intermediate enlarged portion and outwardly extending smaller portions,
   said channel member having upwardly opening slots at longitudinally spaced points,
   and one of said spacer elements having its enlarged portion positioned in said upwardly opening slot with said smaller portions extending outwardly.

9. The combination set forth in claim 8 wherein all portions of each said spacer element are cylindrical.

10. The combination set forth in claim 1 wherein said outwardly extending means comprises a spring member frictionally engaging said channel member,
    said spring member having integral portions thereof extending outwardly into proximity with the inner surface of the walls of said strip.

11. The combination set forth in claim 1 including a collar extending through said channel and surrounding said fastener means.

12. The combination set forth in claim 11 wherein said collar includes an integral flange extending radially outwardly and underlying the base portion of said channel member.

13. The combination set forth in claim 1 wherein said channel member and said strip are substantially longitudinally co-extensive.

14. The combination set forth in claim 1 wherein the ends of each said strip include an end wall tapering downwardly and forwardly.

15. In a car top carrier, the combination comprising:
    a plurality of generally parallel longitudinally extending base strip assemblies,
    each said strip assembly comprising an inverted U-shaped support channel of heavy gauge material including a base portion adapted to extend along the car top,
    and leg portions extending upwardly therefrom,
    a generally U-shaped strip of light weight material telescoped over said support channel,
    said strip comprising a base wall and peripheral walls extending longitudinally of said base wall,
    said base wall engaging the ends of said leg portions of said support channel,
    said leg portions of said support channel being spaced from the side walls of said strip,
    means extending from said leg portions of said channel outwardly into close proximity with the walls of said strip, and
    fastener means extending through said channel for mounting said strip assembly on a car top.

16. The combination set forth in claim 15 wherein said outwardly extending means comprise integral portions.

17. The combination set forth in claim 16 wherein said integral portions comprise struck-out tabs bent downwardly from the leg portions of said channel.

18. The combination set forth in claim 15 wherein said fastener means comprise screws extending through said strip as well as said channel member.

19. The combination set forth in claim 15 wherein portions of said strip engage portions of said channel to hold said channel in position on said strip,
    said fastener means extending through said channel member only.

20. The combination set forth in claim 15 wherein said outwardly extending means comprise integral portions of the side walls of said channel member.

21. The combination set forth in claim 20 including struck-out tabs bent outwardly from the leg portions of said channel member.

22. The combination set forth in claim 15 wherein said outwardly extending means comprises a spacer element having an intermediate enlarged portion and outwardly extending smaller portions,
    said channel member having upwardly opening slots at longitudinally spaced points,
    and said spacer element having its enlarged portion positioned in said upwardly opening slot with said smaller portions extending outwardly.

23. The combination set forth in claim 22 wherein all portions of said spacer element are cylindrical.

24. The combination set forth in claim 15 wherein said outwardly extending means comprises a spring member frictionally engaging said channel member,
    said spring member having integral portions thereof extending outwardly into proximity with the inner surface of the walls of said strip.

25. The combination set forth in claim 15 including a collar extending through said channel and surrounding said fastener means.

26. The combination set forth in claim 25 wherein said collar includes an integral flange extending radially outwardly from the lower end thereof and underlying the base portion of said channel member.

27. The combination set forth in claim 25 wherein said base wall of said strip and the upper end of said collar have generally complementary interengaging surfaces.

28. The combination set forth in claim 15 wherein said channel member and said strip are substantially longitudinally co-extensive.

29. The combination set forth in claim 15 wherein the ends of said strip include an end wall tapering downwardly and forwardly.

References Cited

UNITED STATES PATENTS 3,120,914   2/1964   Smith _____ 224—42.1

FOREIGN PATENTS 1,327,816   4/1963   France.

GERALD M. FORLENZA, Primary Examiner

U.S. Cl. X.R.

293—88